(12) United States Patent
Katahira

(10) Patent No.: US 6,636,711 B1
(45) Date of Patent: Oct. 21, 2003

(54) IMAGE FORMING APPARATUS

(75) Inventor: Shunsuke Katahira, Hachioji (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 392 days.

(21) Appl. No.: 09/799,023

(22) Filed: Mar. 6, 2001

(51) Int. Cl.[7] ............................................. G03G 15/00
(52) U.S. Cl. ........................ 399/82; 399/299; 399/303
(58) Field of Search ............................ 399/82, 85, 299, 399/303, 306, 312, 313, 316, 317

(56) References Cited

U.S. PATENT DOCUMENTS

| 5,765,082 A | 6/1998 | Numazu et al. ............ 399/299 |
| 6,029,023 A | 2/2000 | Munemori et al. ........... 399/66 |
| 6,061,542 A * | 5/2000 | Minami et al. ............. 399/299 |
| 6,470,166 B2 * | 10/2002 | Mizoguchi et al. ......... 399/302 |

FOREIGN PATENT DOCUMENTS

| JP | 9-146383 | | 6/1997 |
| JP | 10-319664 | | 12/1998 |
| JP | 11-109706 | * | 4/1999 |
| JP | 11-167238 | | 6/1999 |

* cited by examiner

Primary Examiner—Hoan Tran
(74) Attorney, Agent, or Firm—Foley & Lardner

(57) ABSTRACT

This invention is to provide a four-series tandem type full-color copying machine in which the position of a conveyor belt is changed in the monochrome mode and color mode to prevent drums used for color copying from being brought into contact with the conveyor belt in the monochrome mode. Therefore, switching from the monochrome mode to the color mode or from the color mode to the monochrome mode is immediately started when the user places a document on an ADF and the specification of mode switching is made by use of a color/monochrome mode switching key, and as a result, time in which the user is kept waiting can be shortened.

9 Claims, 7 Drawing Sheets

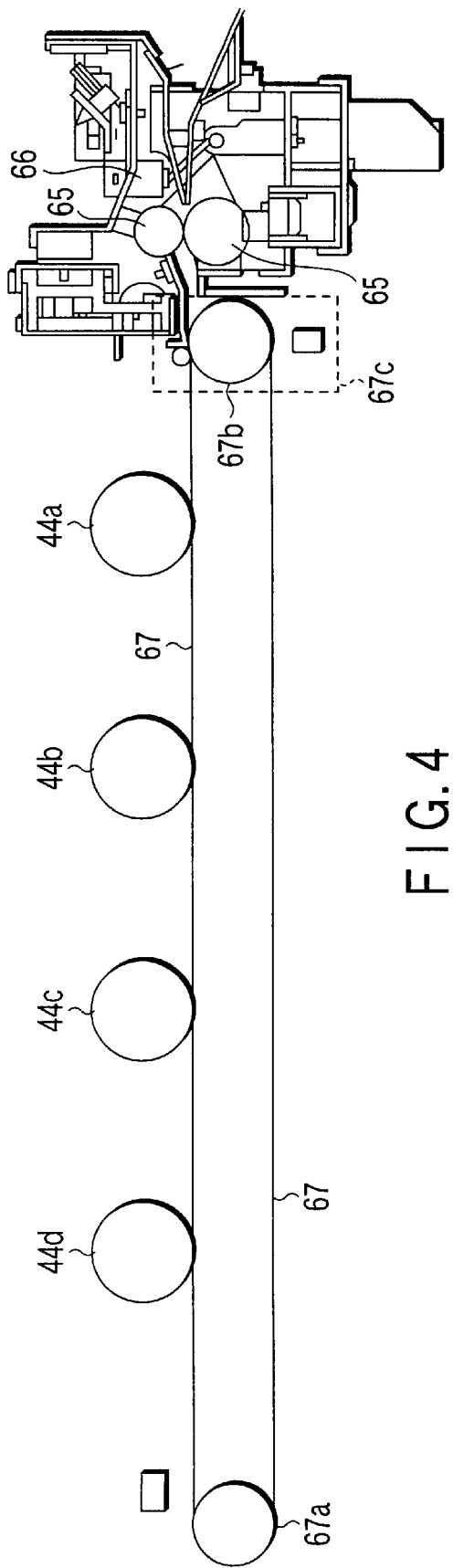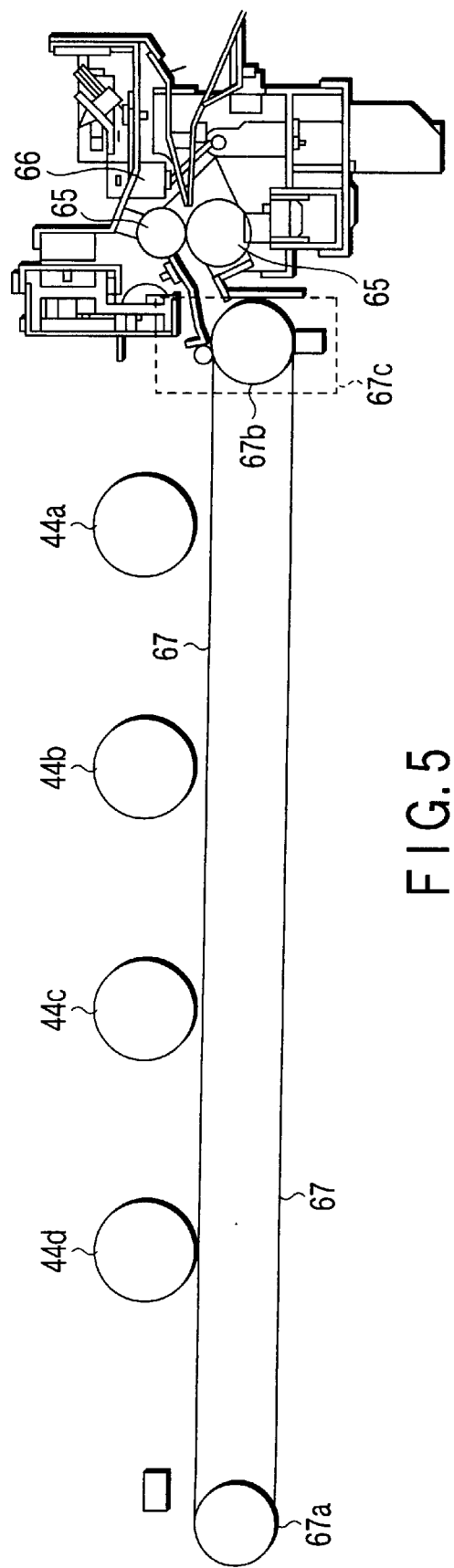

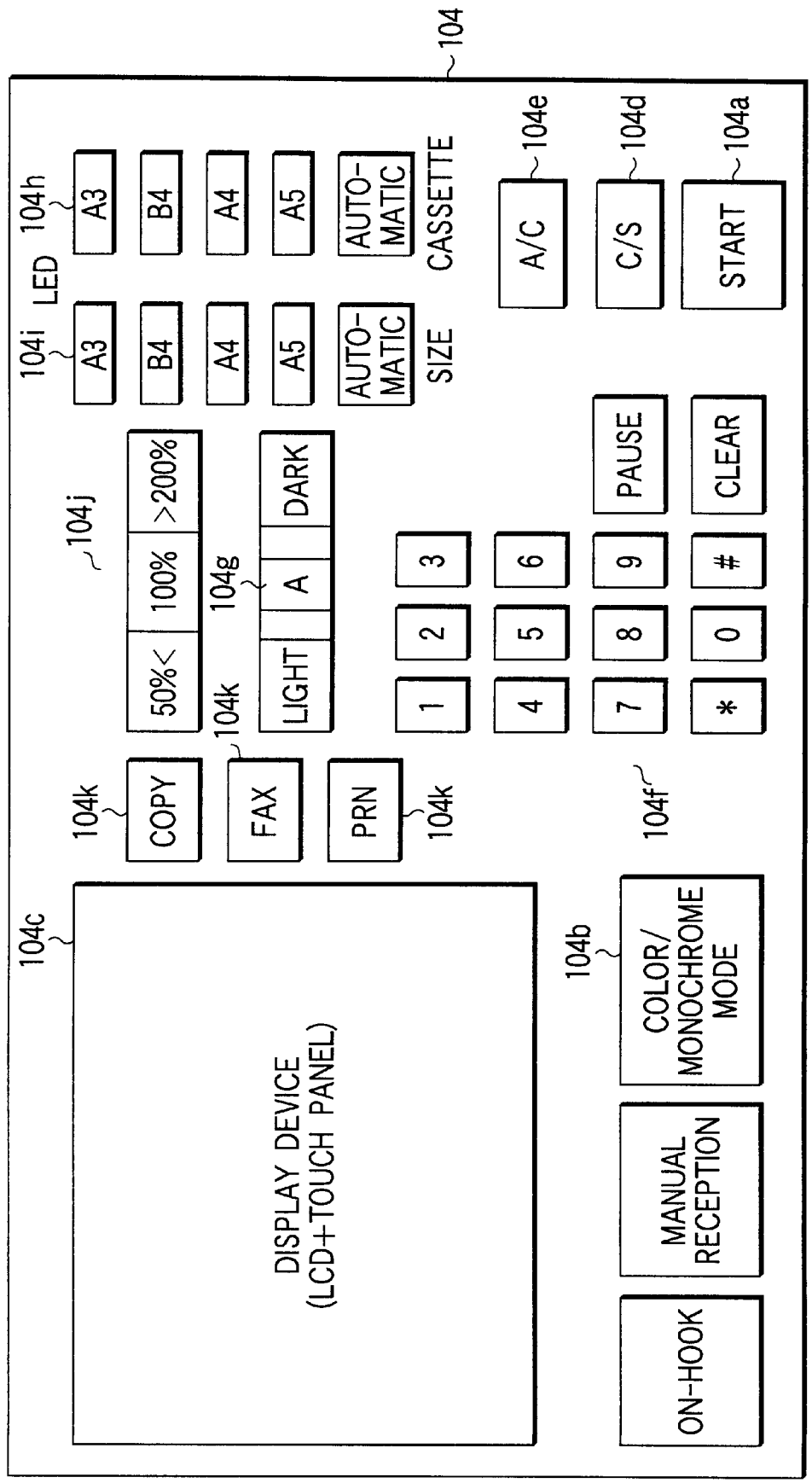
F I G. 7

IMAGE FORMING APPARATUS

BACKGROUND OF THE INVENTION

This invention relates to an image forming apparatus such as a full-color copying machine or color printer.

Conventionally, a so-called four-series tandem type full-color copying machine having four image forming units placed side by side along a conveyor belt and used for respectively forming toner images of colors of yellow (Y), magenta (M), cyan (C), black (B) based on image signals which have been subjected to color separation is known as an image forming apparatus for outputting a color image.

The image forming unit of each color has a photosensitive drum which is rotatably set in contact with the conveyor belt, a charging device for charging the drum surface to a preset potential, an exposure device for exposing the drum surface to form an electrostatic latent image thereon, a developing device for supplying toner to the electrostatic latent image on the drum surface to develop the image, and a transfer device for transferring the developed toner image onto a sheet of recording paper attracted to and transferred by the conveyor belt. The recording paper attracted to the conveyor belt passes through the four image forming units, toner images of the respective colors are transferred onto the recording paper in a superposed form, and then the recording paper is fed to the fixing device which fixes the toner images of the respective colors on the recording paper to form a color image.

The four-series tandem type color copying machine changes the position of the conveyor belt according to the monochrome mode and color mode and prevents the color drums from being brought into contact with the conveyor belt in the monochrome mode.

The monochrome mode is a single color mode using only black and only the image forming unit for forming a toner image of black (B) is set in contact with the conveyor belt in the monochrome mode. The color mode is a multi-color mode of full color and the four image forming units for forming toner images of respective colors of yellow (Y), magenta (M), cyan (C), black (B) are set in contact with the conveyor belt in the color mode.

Conventionally, switching between the monochrome mode and color mode, that is, movement of the conveyor belt is not started until the copy button is depressed after switching between the monochrome mode button and the color mode button is made. The reason why switching between the monochrome mode button and the color mode button is not made immediately after the monochrome mode button or color mode button is depressed is to prevent switching between the monochrome mode and the color mode from frequently occurring by an erroneous operation.

The conventional method has a problem that the copy operation is not performed until the movement of the conveyor belt is terminated since the movement of the conveyor belt caused by switching between the monochrome mode and the color mode is made after the user has depressed the copy button, and therefore, the user is kept waiting.

BRIEF SUMMARY OF THE INVENTION

An object of this invention is to provide a fourseries tandem type full-color copying machine in which waiting time of the user can be shortened by previously making the movement of the conveyor belt caused by specification of switching between the monochrome mode and the color mode before the copy button is depressed.

In order to attain the above object, this invention provides an image forming apparatus comprising a feeding section for feeding a recording medium by use of a conveyor belt; a plurality of image forming units placed side by side along the feeding section and having rotatable photosensitive drums, for respectively transferring images of different colors onto a recording medium fed by the feeding section; specifying means for selectively specifying a monochrome mode in which only one of the plurality of image forming units is used to transfer an image onto a recording medium fed by the feeding section and a color mode in which the plurality of image forming units are used to transfer respective images onto a recording medium fed by the feeding section; an automatic document feeder having a detector for detecting documents placed on a document tray, for sequentially feeding the documents on the document tray onto a document table; reading means for reading an image of the document fed onto the document table by the automatic document feeder; first changing means for determining that the document is placed on the document tray of the automatic document feeder based on a detection signal from the detector and changing the state of the plurality of image forming units and the conveyor belt to a state in which only one of the plurality of image forming units is set in contact with the conveyor belt by moving the image forming units or the conveyor belt when switching from the color mode to the monochrome mode is specified by the specifying means; second changing means for determining that the document is placed on the document tray of the automatic document feeder based on a detection signal from the detector and changing the state of the plurality of image forming units and the conveyor belt to a state in which all of the plurality of image forming units are set in contact with the conveyor belt by moving the image forming units or the conveyor belt when switching from the monochrome mode to the color mode is specified by the specifying means; instructing means for instructing start of an image forming process after a change is made by one of the first and second changing means; and image forming means for forming an image read by the reading means on a recording medium by use of one image forming unit which is set in contact with the conveyor belt by the first changing means or forming an image read by the reading means on a recording medium by use of all of the image forming units which are set in contact with the conveyor belt by the second changing means according to an instruction from the instructing means.

Further, this invention provides an image forming apparatus comprising a feeding section for feeding a recording medium by use of a conveyor belt; a plurality of image forming units placed side by side along the feeding section and having rotatable photosensitive drums, for respectively transferring images of different colors onto a recording medium fed by the feeding section; specifying means for selectively specifying a monochrome mode in which only one of the plurality of image forming units is used to transfer an image onto a recording medium fed by the feeding section and a color mode in which the plurality of image forming units are used to transfer respective images onto a recording medium fed by the feeding section; a document cover for covering a document placed on a document table; detecting means for detecting an open/closed state of the document cover; reading means for reading an image of a document fed onto the document table; first changing means for changing the state of the plurality of image forming units and the conveyor belt to a state in which only one of the plurality of image forming units is set in contact with the conveyor belt by moving the image forming units or the conveyor belt when switching from the color mode to the monochrome mode is specified by the specifying means and the open state of the document cover is detected by the detecting means; second changing means for changing the state of the plurality of image forming units and the conveyor belt to a state in which all of the plurality of image forming units are set in contact with the conveyor belt by moving the image forming units or the conveyor belt when switching from the monochrome mode to the color mode is specified by the specifying means and the open state of the document cover is detected by the detecting means; instructing means for instructing start of an image forming process after a change is made by one of the first and second changing means; and image forming means for forming an image read by the reading means on a recording medium by use of one of the image forming units which is set in contact with the conveyor belt by the first changing means or by use of all of the image forming units which are set in contact with the conveyor belt by the second changing means according to an instruction from the instructing means.

Further, this invention provides an image forming apparatus comprising a feeding section for feeding a recording medium by use of a conveyor belt; a plurality of image forming units placed side by side along the feeding section and having rotatable photosensitive drums, for respectively transferring images of different colors onto a recording medium fed by the feeding section; specifying means for selectively specifying a monochrome mode in which only one of the plurality of image forming units is used to transfer an image onto a recording medium fed by the feeding section and a color mode in which the plurality of image forming units are used to transfer images onto a recording medium fed by the feeding section; an automatic document feeder having a detector for detecting documents placed on a document tray, for sequentially feeding the documents on the document tray onto a document table; reading means for reading an image of a document fed onto the document table by the automatic document feeder; a moving mechanism for vertically moving the conveyor belt; first changing means for determining that the document is placed on the document tray of the automatic document feeder based on a detection signal from the detector and changing the state of the plurality of image forming units and the conveyor belt to a state in which only one of the plurality of image forming units is set in contact with the conveyor belt by downwardly moving the conveyor belt by use of the moving mechanism when switching from the color mode to the monochrome mode is specified by the specifying means; second changing means for determining that the document is placed on the document tray of the automatic document feeder based on a detection signal from the detector and changing the state of the plurality of image forming units and the conveyor belt to a state in which all of the plurality of image forming units are set in contact with the conveyor belt by upwardly moving the conveyor belt by use of the moving mechanism when switching from the monochrome mode to the color mode is specified by the specifying means; instructing means for instructing start of an image forming process after a change is made by one of the first and second changing means; and image forming means for forming an image read by the reading means on a recording medium by use of one of the image forming units which is set in contact with the conveyor belt by the first changing means or by use of all of the image forming units which are set in contact with the conveyor belt by the second changing means according to an instruction from the instructing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing the relation between a feeding roller and photosensitive drums of respective colors in a full-color mode;

FIG. 5 is a view showing the relation between the feeding roller and the photosensitive drums of respective colors in a monochrome mode;

FIG. 7 is a view showing the schematic construction of an operation panel; and

DETAILED DESCRIPTION OF THE INVENTION

There will now be described an image forming apparatus according to an embodiment of this invention with reference to the accompanying drawings.

Figure 1:
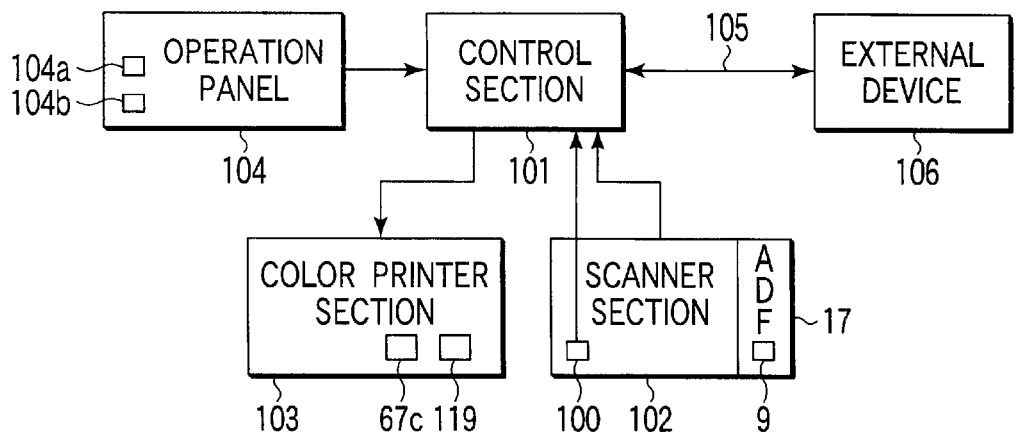
FIG. 1 is a block diagram showing the schematic construction of a color image forming apparatus.

FIG. 1 is a block diagram showing the schematic construction of a color digital copying machine 1 which is one example of a color image forming apparatus of this invention.

As shown in FIG. 1, the color digital copying machine 1 includes a control section (CPU) 101, a scanner section 102 having an automatic document feeder (ADF) 17 which will be described later, a color printer section 103 and an operation panel 104 and is connected to an external device 106 such as a personal computer via a circuit 105, for example, LAN.

The control section (CPU) 102 controls the whole portion of the color digital copying machine 1.

The scanner section 102 reads image information of a to-be-copied object (not shown) placed on a document table by use of the automatic document feeder (ADF) 17 as the brightness of light to form an image signal.

The color printer section 103 forms an image corresponding to an image signal supplied from the scanner section 102 or external device 106.

The operation panel 104 is used for making various settings.

Figure 2:
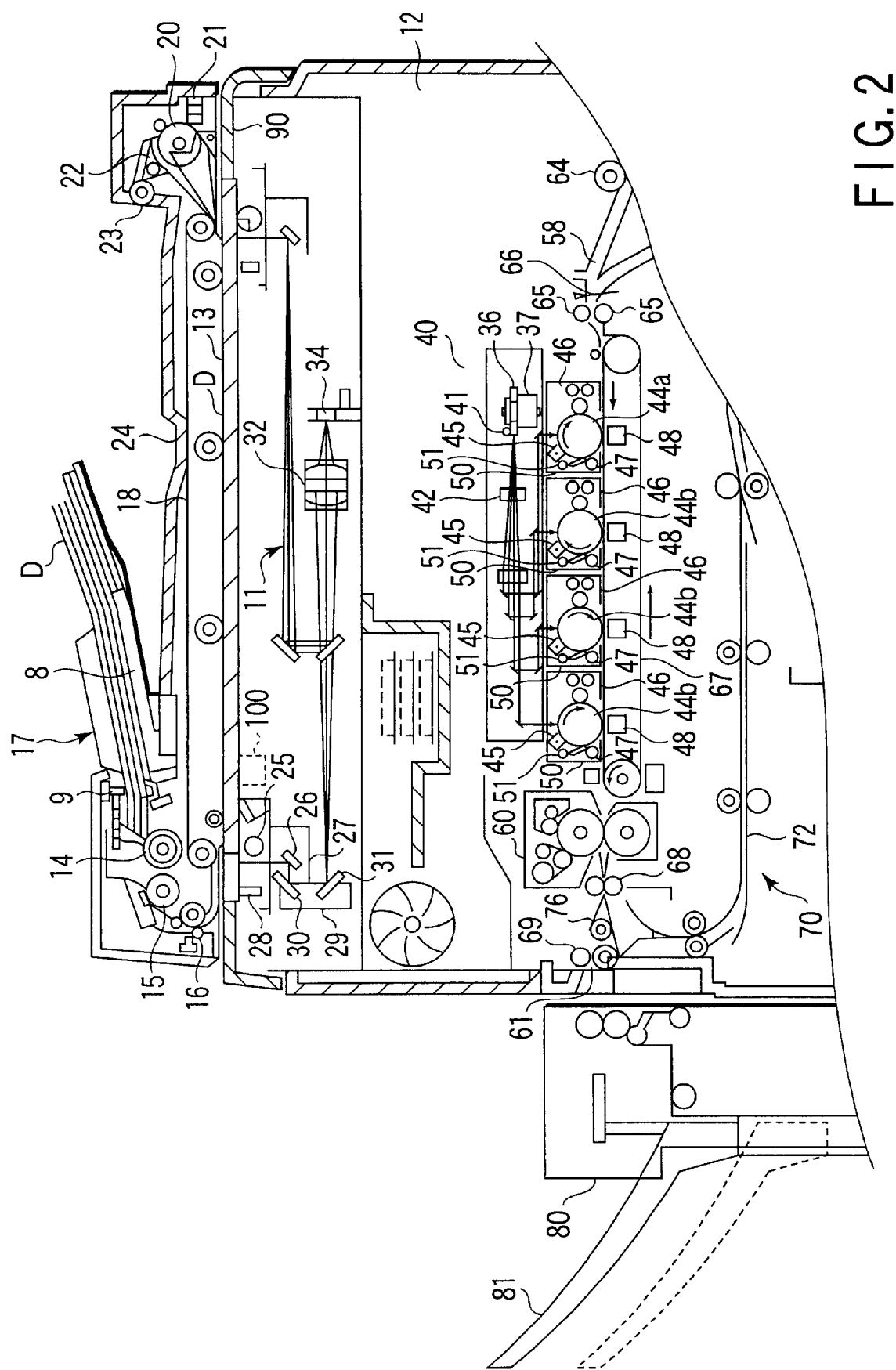
FIGS. 2, 3 are cross sectional views showing the schematic construction of the color image forming apparatus.
Figure 3:
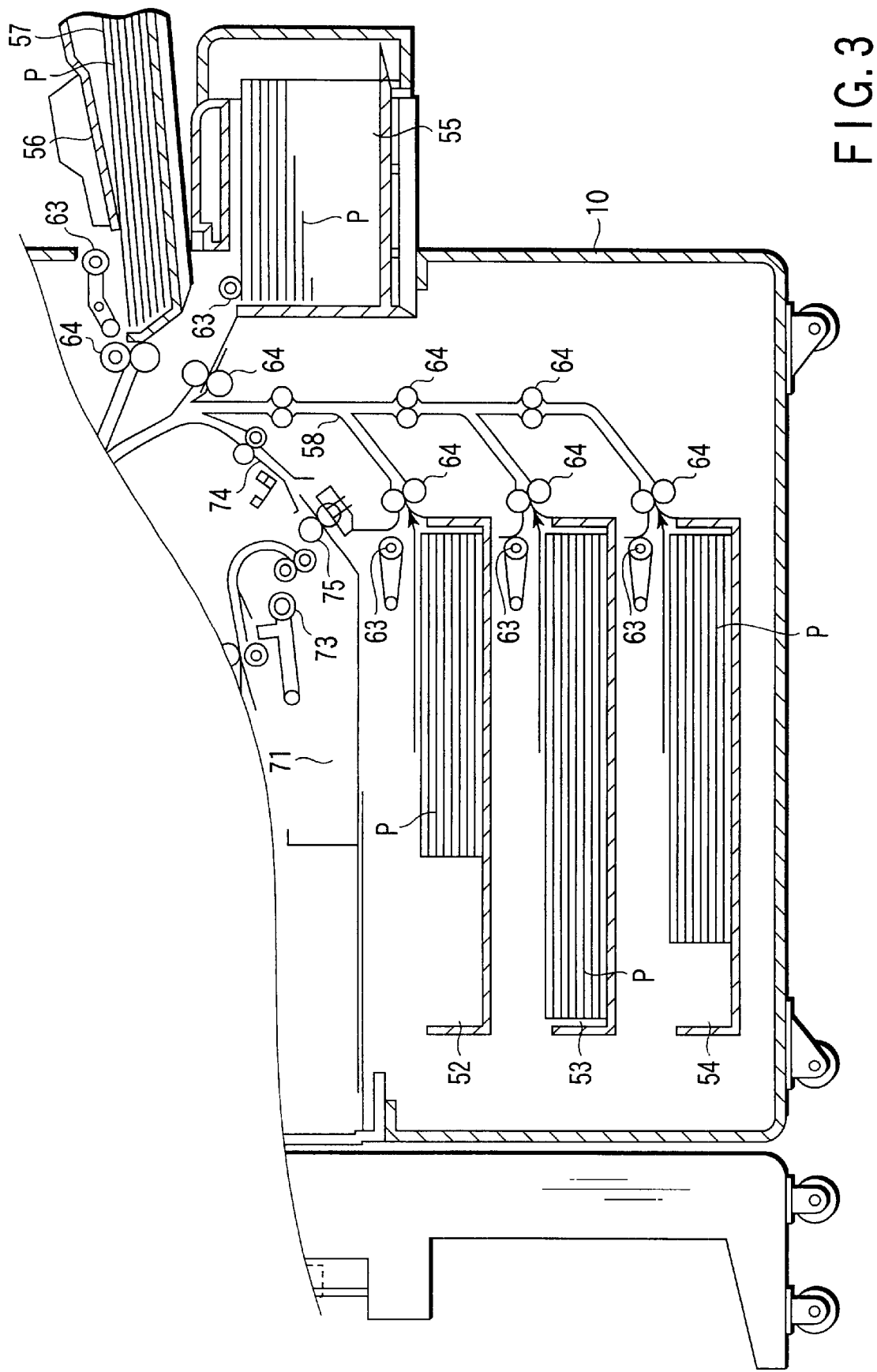

FIGS. 2, 3 are internal construction views for illustrating the color digital copying machine 1.

The automatic document feeder (which is hereinafter referred to as ADF) 17 which is also used as a document cover and automatically feeds sheet-like documents one by one is provided to be freely set into an open/closed state on the upper portion of a device main body 10. A device having a platen mounted thereon and used as the document cover instead of the ADF 17 can be used. The operation panel 104 having various display units and various operation keys for instructing the copy condition and copy start is provided on the front upper portion of the device main body 10. The operation panel 104 is explained in detail later.

A detector 100 for detecting the open/closed state of the ADF 17 is provided on a portion of the device main body 10 which lies near the mounting portion of the ADF 17. The detector 100 detects the open/closed state of a platen when the platen is set instead of the ADF 17.

On the right-side portion of the device main body 10, a sheet storage cassette 57 capable of receiving a small capacity of sheets of paper and a large-capacity sheet storage cassette 55 capable of receiving a large capacity of sheets of paper are removably mounted. The sheet storage cassette 57 has a manual paper-feeding tray 56 used for manually supplying paper.

In the lower portion of the device main body 10, sheet storage cassettes 52, 53, 54 are removably mounted. Sheets of paper of the same size are received in the sheet storage cassettes in the lateral and longitudinal directions and one of them is selectively used as required. On the left-side portion of the device main body 10, a finisher 80 for receiving sheets of copied paper is provided.

In the device main body 10, the scanner section 102 used as acquiring means for acquiring image data and the color printer section 103 used as image forming means are provided to realize the copy function and facsimile function.

On the upper surface of the device main body 10, a document table 13 formed of a transparent glass plate on which a to-be-read object, that is, a document D is placed and the ADF 17 for automatically feeding a document onto the document table 13 are arranged. The ADF 17 is movably disposed to cover the document table 13 and functions as a document cover for closely attaching the document placed on the document table 13 to the document table 13.

The ADF 17 includes a document tray 8 on which documents D are set, an empty sensor 9 for detecting the presence/absence of a document, a pickup roller 14 for taking out documents D one by one from the document tray 8, a paper feeding roller 15 for feeding the taken-out document D, an aligning roller pair 16 for aligning the front end of the document D, an aligning sensor (not shown) disposed on the upstream side of the aligning roller pair 16, for sensing arrival of the document D, a size sensor (not shown) for sensing the size of the document D, and a conveyor belt 18 arranged to substantially cover the whole portion of the document table 13. A plurality of documents set on the document tray with the face up are sequentially taken out starting from the bottom page, that is, the last page thereof, the front end of the taken-out document is aligned by the aligning roller pair 16 and then the thus aligned document is fed to a preset position of the document table 13 by the conveyor belt 18.

A reversing roller 20, non-reversal sensor 21, flapper 22, and paper discharging roller 23 are arranged on the end portion of the ADF 17 which is opposite to the aligning roller pair 17 with the conveyor belt 18 disposed therebetween. The document D whose image information is read by the scanner section 102 which will be described later is fed out from the document table 13 by the conveyor belt 18 and then discharged onto a document discharging section 24 on the upper surface of the ADF 17 via the reversing roller 20, flapper 22 and paper discharging roller 23.

In a case where the image of the document D on the rear surface is read, the document D fed by the conveyor belt 18 is reversed by the reversing roller 20 and then fed to the preset position on the document table 13 by the conveyor belt 18 again.

The ADF 17 further includes a paper feeding motor for driving the pickup roller 14, paper feeding roller 15 and aligning roller pair 16 and a feeding motor for driving the conveyor belt 18, reversing roller 20 and paper discharging roller 23.

The scanner section 102 disposed in the device main body 10 includes a light source 25 such as a fluorescent light for illuminating a document D placed on the document table 13, and a first mirror 26 for deflecting reflected light from the document D in a preset direction. The light source 25 and first mirror 26 are mounted on a first carriage 27 disposed below the document table 13. A size sensor 28 for detecting the size of the document placed on the document table 13 is mounted on the first carriage 27. The first carriage 27 is disposed to be movable in parallel to the document table 13 and is reciprocally moved below the document table 13 by a driving motor via a toothed belt (not shown) or the like.

Further, a second carriage 29 which is movable in parallel to the document table is disposed below the document table 13. On the second carriage 29, second and third mirrors 30, 31 for sequentially deflecting light reflected from the document D and deflected by the first mirror 26 are arranged at right angles to each other. The second carriage 29 is moved to follow the movement of the first carriage 27 by the toothed belt or the like for driving the first carriage 27 and is moved in parallel to the document table 13 at half the speed of the first carriage.

An image forming lens 32 for focusing the reflected light from the third mirror 31 on the second carriage 29 and a CCD sensor 34 for receiving the reflected light focused by the focusing lens and photoelectrically converting the received light are arranged below the document table 13. The focusing lens 32 is disposed to be moved by a driving mechanism in a plane containing the light axis of light deflected by the third mirror 31 and forms an image based on the reflected light at a desired magnification by the movement thereof. The CCD sensor 34 photoelectrically converts the incident reflected light and outputs an electrical signal corresponding to the read image of the document D.

The color printer section 103 includes a laser exposure device 40 used as exposure means. The laser exposure device 40 includes a semiconductor laser 41 used as a light source, a polygon mirror 36 used as a canning member for continuously deflecting laser light emitted from the semiconductor laser 41, a polygon motor 37 used as a scanning motor for driving and rotating the polygon mirror 36 at a preset rotating speed as will be described later, and an optical system 42 for deflecting the laser light from the polygon mirror 36 to photosensitive drums 44a to 44d which will be described later. With the above construction, the laser exposure device 40 is fixed and supported on a supporting frame (not shown) of the device main body 10.

The semiconductor laser 41 is ON/OFF-controlled according to image information of the document D read by the scanner section 102 and laser light emitted from the semiconductor laser is directed towards the photosensitive drums 44a to 44d via the polygon mirror 36 and optical system 42 to scan the outer surfaces of the photosensitive drums 44a to 44d and form electrostatic latent images on the outer surfaces of the photosensitive drums 44a to 44d.

The image forming section 12 includes the photosensitive drums 44a to 44d used as image carriers rotatably arranged at substantially the central portion of the device main body 10 and desired electrostatic latent images are formed on the outer surfaces of the photosensitive drums 44a to 44d by exposing the outer surfaces thereof by the laser light from the laser exposure unit 40.

Around the respective photosensitive drums 44a to 44d, electric chargers 45, . . . for electrifying preset amounts of charges on the outer surfaces of the photosensitive drums 44a to 44d, developing devices 46, . . . for supplying toner as developing powder to electrostatic latent images formed on the outer surfaces of the photosensitive drums 44a to 44d to develop the electrostatic latent images with desired image densities, separation chargers 47, . . . for separating a to-be-transferred material (recording medium), that is, copy paper P supplied from the sheet storage cassette 52, 53, 54, 55, 57 from the outer surfaces of the photosensitive drums 44a to 44d, transfer chargers 48, . . . for transferring toner images formed on the outer surfaces of the photosensitive drums 44a to 44d onto the paper P, separation pawls (not shown) for separating the copy paper P from the outer surfaces of the photosensitive drums 44a to 44d, cleaning devices 50, for cleaning toner left behind on the outer surfaces of the photosensitive drums 44a to 44d, and discharging devices 51, . . . for discharging charges left behind on the outer surfaces of the photosensitive drums 44a to 44d are arranged in this order.

Image forming units 45a to 45d are respectively constructed by the photosensitive drums 44a to 44d and the surrounding devices.

In the example of this invention, Y, M, C and B images of four colors are superposed on the copy paper P in this order from the upstream side of the direction in which a desired point on a conveyor belt 67 is moved, that is, the copy paper P is fed, and therefore, the image forming units 45a to 45d are arranged in an order of Y, M, C, B.

In the lower portion of the device main body 10, the sheet storage cassettes 52, 53, 54 which can be withdrawn from the device main body 10 are arranged in a stacked form and sheets of copy paper P of different sizes are stored in the respective cassettes 52, 53, 54. The large-capacity sheet storage cassette 55 is disposed beside the cassettes 52, 53, 54 and, for example, 3000 sheets of copy paper which is frequently used, for example, A4-size copy paper are received in the large-capacity sheet storage cassette 55. The sheet storage cassette 57 which is also used as the manual paper-feeding tray 56 is removably mounted on the device main body above the large-capacity sheet storage cassette 55.

A feeding path 58 extending from the respective cassettes along the transfer section which lies between the photosensitive drums 44a to 44d and the transfer chargers 48 is formed in the device main body 10 and a fixing device 60 is disposed at the end of the feeding path 58. A sheet discharging port 61 is formed in the side wall of the device main body 10 which faces the fixing device 60 and a finisher 81 is mounted on the side wall corresponding in position to the sheet discharging port 61.

Pickup rollers 63 for taking out sheets of paper one by one from the cassette are respectively disposed near the sheet storage cassettes 52, 53, 54, 55 and 57. Pairs of paper feeding rollers 64 for feeding copy paper P taken out by the pickup roller 63 via the feeding path 58 are disposed on the feeding path 58.

A resist roller pair 65 is disposed on the feeding path 58 on the upstream side of the photosensitive drums 44a to 44d.

The resist roller pair 65 acts to correct the inclination of the taken-out copy paper P, align the front end of the copy paper P with the front end of each of the toner images on the outer surfaces of the photosensitive drums 44a to 44d and feed the copy paper P to the transfer section at the same speed as the moving speed of the outer surfaces of the photosensitive drums 44a to 44d. An aligning sensor 66 for detecting arrival of the copy paper P is disposed on the front side of the resist roller pair 65, that is, on the side of the paper feeding roller 64.

Each of the sheets of copy paper P taken out one by one from the cassette by the pickup roller 63 is fed to the resist roller pair 65 by means of the paper feeding roller pairs 64. Then, the copy paper P is fed to the transfer section by the conveyor belt (transfer belt) 67 after the front end thereof is aligned by the resist roller pair 65.

In the transfer section, developer images or toner images formed on the respective photosensitive drums 44a to 44d are transferred to the copy paper P by the respective transfer chargers 48. The copy paper P having the toner images transferred thereon is separated from one of the outer surfaces of the photosensitive drums 44a to 44d by the action of the separation charger 47 and separation pawl (not shown) and then fed to the fixing device 60 via the conveyor belt 67 constructing part of the feeding path 58. After the developer image is melt and fixed on the copy paper P by the fixing device 60, the copy paper P is discharged to the paper discharging tray 81 of the finisher 80 via the discharging port 61 by the paper feeding roller pair 68 and paper discharging roller pair 69.

The conveyor belt 67 is formed of electrically conductive polyurethane rubber and stretched between a first roller (driving roller) 67a and a second roller (driven roller) 67b so that a desired point on the conveyor belt 67 can be moved in a preset direction by rotating the driving roller 67a.

Further, the conveyor belt 67 is vertically moved by a moving mechanism 67c disposed near the driven roller 67b with the driving roller 67a used as the fulcrum.

FIG. 4 shows a state in which a portion of the conveyor belt 67 on the driven roller 67b side is moved to the upward movement position by the conveyor belt moving mechanism 67c and which is set in the color mode. In this case, all of the photosensitive drums 44a to 44d are set in contact with the conveyor belt 67 and developer images of yellow, magenta, cyan and black formed on the photosensitive drums 44a to 44d are sequentially transferred in this order onto the copy paper P fed from the resist roller pair 65 by the conveyor belt 67.

FIG. 5 shows a state in which a portion of the conveyor belt 67 on the driven roller 67b side is moved to the downward movement position by the conveyor belt moving mechanism 67c and which is set in the monochrome mode. In this case, only the photosensitive drum 44d is set in contact with the conveyor belt 67 and a black developer image formed on the photosensitive drum 44d is transferred onto the copy paper P fed from the resist roller pair 65 by the conveyor belt 67.

An automatic double-face setting device (ADD) 70 for reversing or turning over the copy paper P which has passed through the fixing device 60 and feeding the copy paper to the resist roller pair 65 again is disposed below the feeding path 58. The automatic double-face setting device 70 includes a temporary storage section 71 for temporarily storing sheets of copy paper P, a reversing path 72 branching from the feeding path 58, for reversing the copy paper P which has passed through the fixing unit 60 and guiding the thus reversed copy paper P to the temporary storage section 71, a pickup roller 73 for taking out sheets of copy paper P stored in the temporary storage section one by one, and a paper feeding roller 75 for feeding the taken-out copy paper to the resist roller pair 65 via a feeding path 74. A distributing gate 76 for selectively distributing the copy paper P to the discharging port 61 or reversing path 72 is disposed at the branching portion of the feeding path 58 and the reversing path 72.

When the double-face copying operation is effected, the copy paper P which has passed through the fixing device 60 is guided to the reversing path 72 by the distributing gate 76, temporarily stored in the temporary storage section 71 while it is kept in the reversed state, and then fed to the resist roller pair 65 via the feeding path 74 by the pickup roller 73 and paper feeding roller pair 75. After the copy paper P is aligned by the resist roller pair 65, it is fed to the transfer section again, and a toner image is transferred onto the rear surface of the copy paper P. After this, the copy paper P is discharged to the discharge tray 81 of the finisher 80 via the feeding path 58, fixing device 60 and discharging roller 69.

It is possible to discharge the copy paper with the printed face down by use of the automatic double-date setting device 70. That is, an image is first transferred onto and fixed on the front surface of the copy paper, then the copy paper is temporarily stored in the temporary storage section 71 in the same manner as in the double-face copying operation, fed to the resist roller pair 65 by the pickup roller 73 and paper feeding roller pair 75, aligned by the resist roller pair 65, and then discharged to the discharge tray 81 of the finisher 80 via the feeding path 58, fixing device 60 and discharging roller 69.

Figure 6:
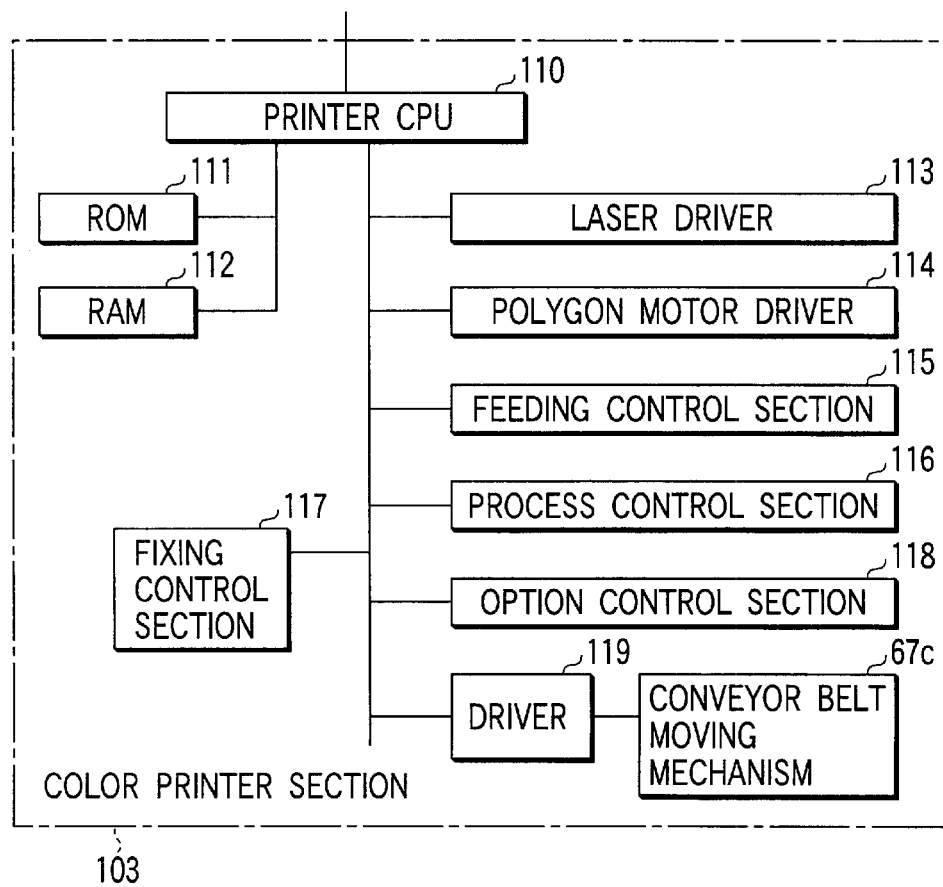
FIG. 6 is a block diagram showing the schematic construction of a color printer section.

FIG. 6 is a block diagram showing the construction of the control system of the color printer section 130.

The color printer section 130 includes a printer CPU 110 for controlling the whole portion thereof, a ROM 111 for storing a control program and the like, a RAM 112 for storing data, a laser driver 113 for driving a semiconductor laser oscillator (not shown), a polygon motor driver 114 for driving a polygon motor (not shown) of an exposure device (not shown), a feeding control section 115 for controlling the operation for feeding the copy paper P by a feeding mechanism (not shown), a process control section 116 for controlling the process for performing charging, developing and transferring processes by use of the charging device, developing roller and transfer device, a fixing control section 117 for controlling the fixing device (not shown), an option control section 118 for controlling options, and a driver 119 for driving the conveyor belt moving mechanism 67c.

FIG. 7 is a view showing the construction of the operation panel 104. As shown in FIG. 7, the operation panel 104 includes a start key 104a depressed at the copy starting time, a color/monochrome mode switching key 104b for selectively setting one of the color mode and monochrome mode, a touch panel display 104c for displaying various operation guidance contents, a clear/stop key 104d, an all-clear key 104e, a ten-key pad 104f for setting numerals, a density key 104g, a key 104h for selecting one of the cassettes, a key 104i for selecting the document size, a copy magnification setting key 104j, and an operation mode selecting key 104k for selecting one of operation modes of a FAX or printer, for example. The ten-key pad 104f has the same key array as that of a button telephone so as to be commonly used in the copying mode and FAX mode.

Figure 8:
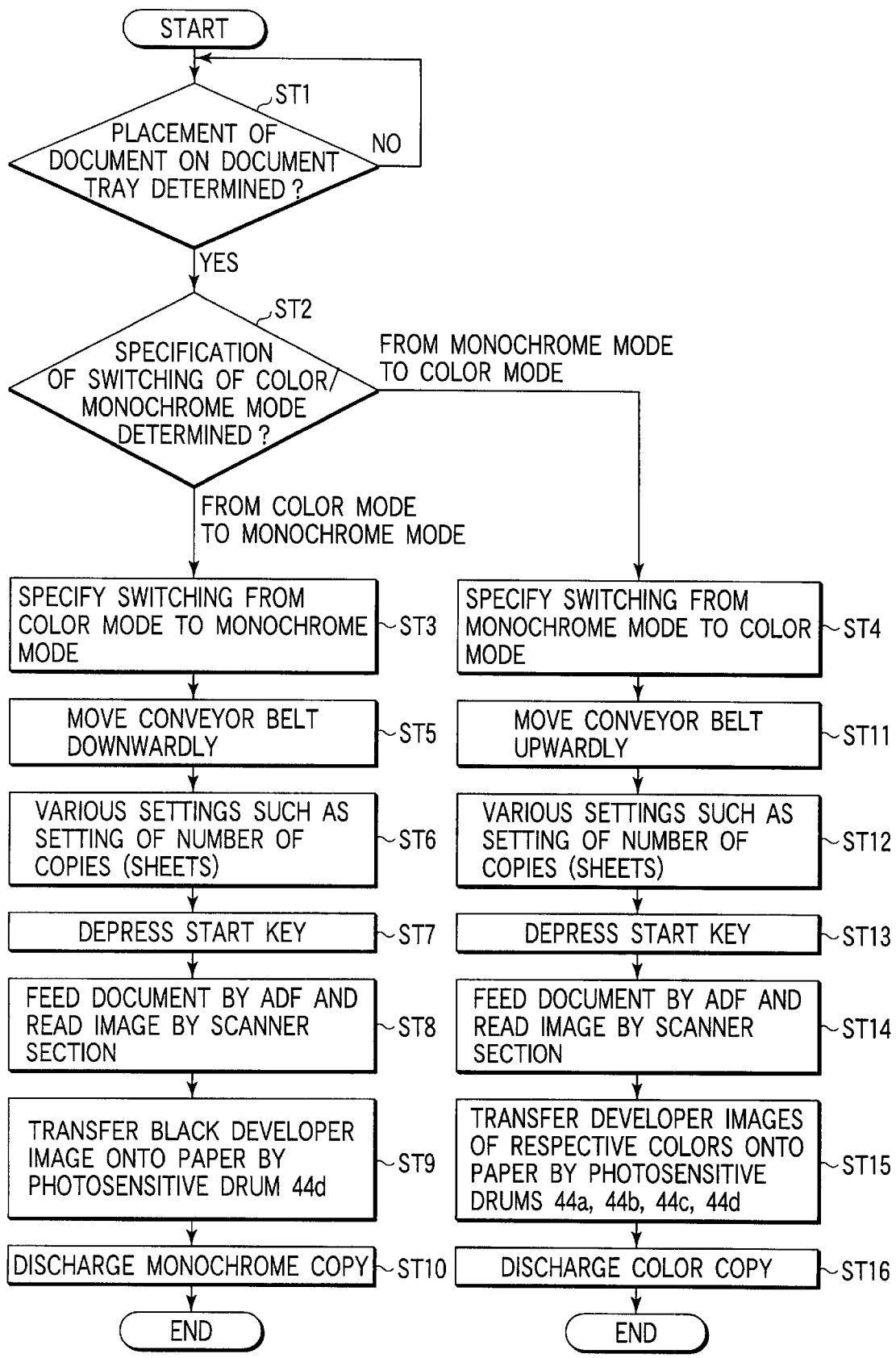
FIGS. 8, 9 are flowcharts for illustrating the process at the copy starting time.
Figure 9:
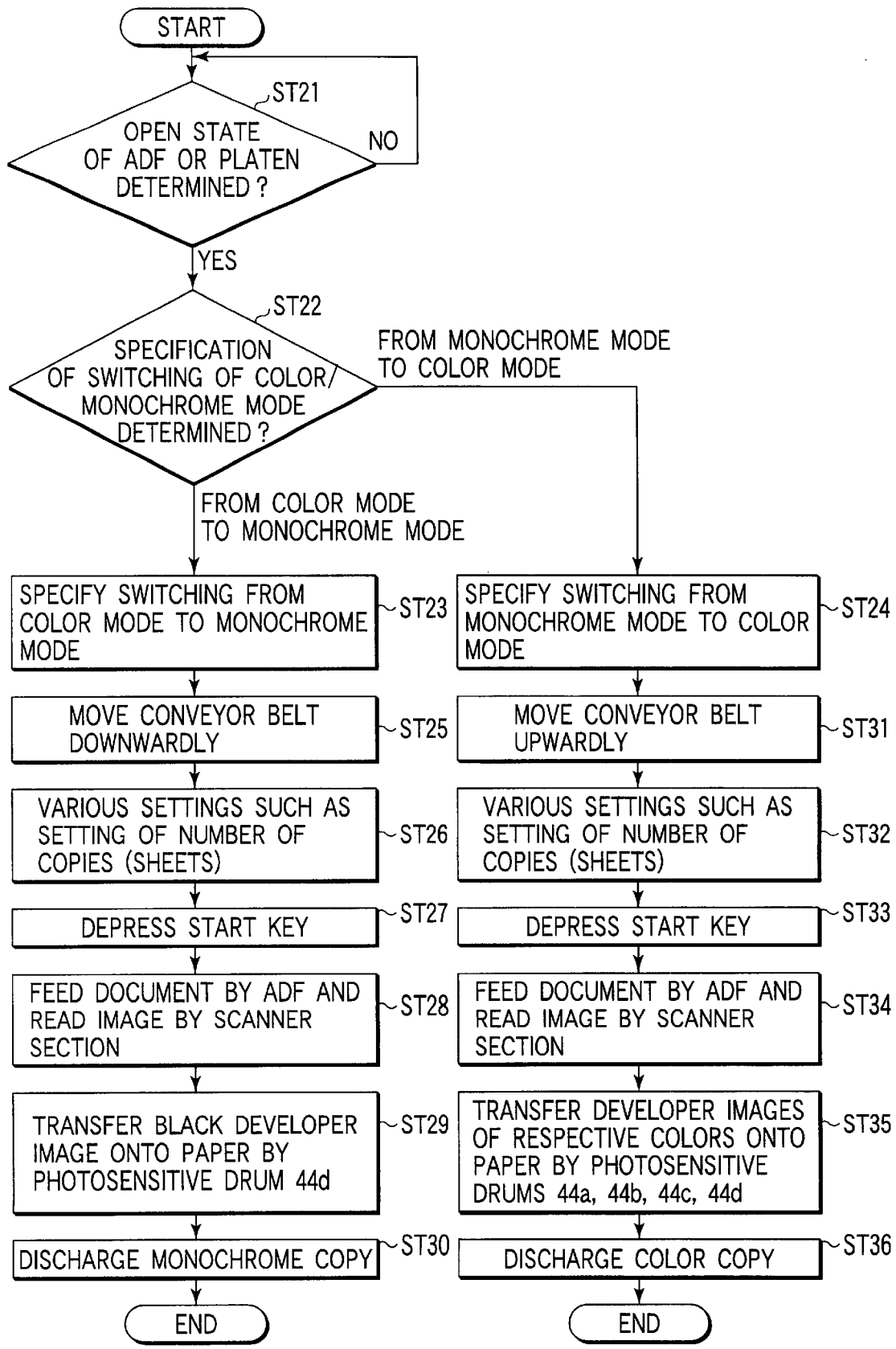

Next, with the above construction, the process at the copy starting time is explained with reference to the flowchart shown in FIGS. 8, 9.

For example, assume now that the user places a document D on the document tray 8 of the ADF 17 and specifies the switching from the color mode to the monochrome mode or from the monochrome mode to the color mode by use of the color/monochrome mode switching key 104b. Then, the control section 101 determines that the document D is placed on the document tray 8 according to a detection signal from the detector 9 (ST1), determines the specification of mode switching by the color/monochrome mode switching key 104b (ST2), and specifies the switching from the color mode to the monochrome mode (ST3) or specifies the switching from the monochrome mode to the color mode (ST4).

If switching from the color mode to the monochrome mode is specified in the step ST3, the control section 101 supplies a control signal to the printer CPU 110 of the color printer section 103. The printer CPU 110 controls the conveyor belt moving mechanism 67c via the driver 120 to move the end portion of the conveyor belt 67 which lies on the second roller (driven roller) 67b side downwardly with the first roller (driving roller) 67a used as the fulcrum (ST5). As a result, only the photosensitive drum 44d is brought into contact with the conveyor belt 67 and the other photosensitive drums 44a, 44b, 44c are brought into non-contact with the conveyor belt 67.

Further, the user makes various settings, for example, setting of the number of copies (the number of sheets) by use of the operation panel 104 (ST6) and then depresses the start key 104a (ST7).

As a result, documents D on the document tray 8 of the ADF 17 are sequentially fed to and placed on the document table 13 and images of the documents D are sequentially read by the scanner section 102 and supplied to the color printer section 103 (ST8).

The exposure device 40 is driven according to the read image to form an electrostatic latent image corresponding to the read image on the photosensitive drum 44d. On the other hand, a sheet of paper P is taken out from the sheet storage cassette 52, 53, 54, 55 or 57 and fed on the feeding path 58 by the conveyor belt 67. The electrostatic latent image on the photosensitive drum 44d is developed by black toner and transferred onto the paper P on the conveyor belt 67 by the transfer device 48 (ST9).

A developer image corresponding to the document image is fixed on the paper P by the fixing device 60 and then the paper P is discharged as a monochrome copy (ST10).

If switching from the monochrome mode to the color mode is specified in the step ST4, the control section 101 supplies a control signal to the printer CPU 110 of the color printer section 103. The printer CPU 110 controls the conveyor belt moving mechanism 67c via the driver 120 to move the end portion of the conveyor belt 67 which lies on the second roller (driven roller) 67b side upwardly with the first roller (driving roller) 67a used as the fulcrum (ST11). As a result, all of the photosensitive drums 44a, 44b, 44c, 44d are brought into contact with the conveyor belt 67.

Further, the user makes various settings, for example, setting of the number of copies (the number of sheets) by use of the operation panel 104 (ST12) and then depresses the start key 104a (ST13).

As a result, documents D on the document tray 8 of the ADF 17 are sequentially fed to and placed on the document table 13 and images of the documents D are sequentially read by the scanner section 102 and supplied to the color printer section 103 (ST14).

The exposure device 40 is driven according to the read image to form an electrostatic latent image corresponding to the read image on each of the photosensitive drums 44*a*, 44*b*, 44*c*, 44*d*. On the other hand, a sheet of paper P is taken out from the sheet storage cassette 52, 53, 54, 55 or 57 and fed on the feeding path 58 by the conveyor belt 67. The electrostatic latent images on the respective photosensitive drums 44*a*, 44*b*, 44*c*, 44*d* are developed by toner of corresponding colors and sequentially transferred onto the paper P on the conveyor belt 67 by the respective transfer devices 48 (ST15).

Developer images corresponding to the document image are fixed on the paper P by the fixing device 60 and then the paper P is discharged as a color copy (ST16).

As described above, the specification of switching from the monochrome mode to the color mode or from the color mode to the monochrome mode is started immediately after the document D is placed on the document tray 8 of the ADF 17 and the specification of switching is made by the color/monochrome mode switching key 104*b*.

Further, the same operation as described above is effected in the case where the specification of switching from the monochrome mode to the color mode or from the color mode to the monochrome mode is immediately started when the document D is placed on the document tray 8 of the ADF 17 after the specification of switching is made by use of the color/monochrome mode switching key 104*b*.

Also, if the document D is manually placed on the document table 13 and subjected to the copying process, the same operation as described above is effected in the case where the specification of switching from the monochrome mode to the color mode or from the color mode to the monochrome mode is immediately started when the ADF 17 or platen is opened after the specification of switching is made by use of the color/monochrome mode switching key 104*b*.

Further, the same operation as described above is effected in the case where the specification of switching from the monochrome mode to the color mode or from the color mode to the monochrome mode is immediately started if the specification of switching is made by use of the color/monochrome mode switching key 104*b* within a preset period of time after the ADF 17 or platen is opened.

For example, assume now that the specification of switching from the color mode to the monochrome mode or from the monochrome mode to the color mode is made by use of the color/monochrome mode switching key 104*b* within a preset period of time after the ADF 17 or platen is opened by the user. Then, the control section 101 determines that the ADF 17 or platen is opened according to a detection signal from the detector 9 (ST21) and if it determines that the specification of mode switching by use of the color/monochrome mode switching key 104*b* is made (ST22), the control section makes switching from the color mode to the monochrome mode (ST23) or from the monochrome mode to the color mode (ST24).

If switching from the color mode to the monochrome mode is specified in the step ST23, the control section 101 supplies a control signal to the printer CPU 110 of the color printer section 103. The printer CPU 110 controls the conveyor belt moving mechanism 67*c* via the driver 120 to move the end portion of the conveyor belt 67 which lies on the second roller (driven roller) 67*b* side downwardly with the first roller (driving roller) 67*a* used as the fulcrum (ST25). As a result, only the photosensitive drum 44*d* is brought into contact with the conveyor belt 67 and the other photosensitive drums 44*a*, 44*b*, 44*c* are brought into non-contact with the conveyor belt 67.

Further, the user makes various settings, for example, setting of the number of copies (the number of sheets) by use of the operation panel 104 (ST26) and then depresses the start key 104*a* (ST27).

As a result, documents D on the document tray 8 of the ADF 17 are sequentially fed to and placed on the document table 13 and images of the documents D are sequentially read by the scanner section 102 and supplied to the color printer section 103 (ST28).

The exposure device 40 is driven according to the read image to form an electrostatic latent image corresponding to the read image on the photosensitive drum 44*d*. On the other hand, a sheet of paper P is taken out from the sheet storage cassette 52, 53, 54, 55 or 57 and fed on the feeding path 58 by the conveyor belt 67. The electrostatic latent image on the photosensitive drum 44*d* is developed by black toner and transferred onto the paper P on the conveyor belt 67 by the transfer device 48 (ST29).

A developer image corresponding to the document image is fixed on the paper P by the fixing device 60 and then the paper P is discharged as a monochrome copy (ST30).

If switching from the monochrome mode to the color mode is specified in the step ST24, the control section 101 supplies a control signal to the printer CPU 110 of the color printer section 103. The printer CPU 110 controls the conveyor belt moving mechanism 67*c* via the driver 120 to move the end portion of the conveyor belt 67 which lies on the second roller (driven roller) 67*b* side upwardly with the first roller (driving roller) 67*a* used as the fulcrum (ST31). As a result, all of the photosensitive drums 44*a*, 44*b*, 44*c*, 44*d* are brought into contact with the conveyor belt 67.

Further, the user makes various settings, for example, setting of the number of copies (the number of sheets) by use of the operation panel 104 (ST32) and then depresses the start key 104*a* (ST33).

As a result, documents D are sequentially fed to and placed on the document table 13 and images of the documents D are sequentially read by the scanner section 102 and supplied to the color printer section 103 (ST34).

The exposure device 40 is driven according to the read image to form an electrostatic latent image corresponding to the read image on each of the photosensitive drums 44*a*, 44*b*, 44*c*, 44*d*. On the other hand, a sheet of paper P is taken out from the sheet storage cassette 52, 53, 54, 55 or 57 and fed on the feeding path 58 by the conveyor belt 67 (ST41). The electrostatic latent images on the respective photosensitive drums 44*a*, 44*b*, 44*c*, 44*d* are developed by toner of corresponding colors and sequentially transferred onto the paper P on the conveyor belt 67 by the respective transfer devices 48 (ST35).

Developer images corresponding to the document image are fixed on the paper P by the fixing device 60 and then the paper P is discharged as a color copy (ST36).

As described above, the specification of switching from the monochrome mode to the color mode or from the color mode to the monochrome mode is immediately started when the specification of switching is made by use of the color/monochrome mode switching key 104*b* within a preset period of time after the ADF 17 or platen is opened.

Further, the same operation as described above is effected in the case where the switching from the monochrome mode to the color mode or from the color mode to the monochrome mode is immediately made when the ADF 17 or platen is opened within a preset period of time after the specification of switching is made by use of the color/monochrome mode switching key 104*b*.

As described above, since the switching from the monochrome mode to the color mode or from the color mode to the monochrome mode is immediately started when documents are placed on the automatic document feeder by the user and the specification of mode switching is made by use of the color/monochrome mode switching key, the conveyor belt is moved in a period of time until various settings, for example, setting of the number of copy sheets are made and the start key is depressed, and therefore, time in which the user is kept waiting can be shortened.

Further, since movement of the conveyor belt is started when the user opens the platen to place documents or when the automatic document feeder is opened and setting of the color/monochrome mode switching key is switched in the case where documents are manually placed, the conveyor belt is moved while the user is making various settings, for example, setting of the number of copy sheets, and therefore, time in which the user is kept waiting can be shortened.

In the above embodiment, a case wherein the photosensitive drums which are brought into contact with the conveyor belt are changed by vertically moving the end portion of the conveyor belt is explained, but this invention is not limited to this case, and it is also possible to independently move the photosensitive drums 44a to 44d of the respective colors or the units including the photosensitive drums 44a to 44d without moving the conveyor belt, move only the photosensitive drum 44d to be brought into contact with the conveyor belt 67 in the monochrome mode, and move the photosensitive drums 44a to 44d to be brought into contact with the conveyor belt 67 in the color mode.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. An image forming apparatus comprising:

a feeding section for feeding a recording medium by use of a conveyor belt;

a plurality of image forming units placed side by side along said feeding section and having rotatable photosensitive drums, for transferring images of different colors onto a recording medium fed by said feeding section;

specifying means for selectively specifying a monochrome mode in which only one of said plurality of image forming units is used to transfer an image formed thereon onto a recording medium fed by said feeding section and a color mode in which said plurality of image forming units are used to transfer images formed thereon onto a recording medium fed by said feeding section;

an automatic document feeder having a detector for detecting documents on a document tray, for sequentially feeding the documents on the document tray onto a document table;

reading means for reading an image of a document fed onto the document table by said automatic document feeder;

first changing means for determining that the document is placed on the document tray of said automatic document feeder based on a detection signal from the detector and changing a state of said plurality of image forming units and the conveyor belt to a state in which only one of said plurality of image forming units is set in contact with the conveyor belt by moving said image forming units or the conveyor belt when switching from the color mode to the monochrome mode is specified by said specifying means;

second changing means for determining that the document is placed on the document tray of said automatic document feeder based on a detection signal from the detector and changing the state of said plurality of image forming units and the conveyor belt to a state in which all of said plurality of image forming units are set in contact with the conveyor belt by moving said image forming units or the conveyor belt when switching from the monochrome mode to the color mode is specified by said specifying means;

instructing means for instructing start of an image forming process after a change is made by one of said first and second changing means; and image forming means for forming an image read by said reading means on a recording medium by use of said one image forming unit which is set in contact with the conveyor belt by said first changing means or forming an image read by said reading means on a recording medium by use of all of said image forming units which are set in contact with the conveyor belt by said second changing means according to an instruction from said instructing means.

2. The image forming apparatus according to claim 1, wherein said image forming units are yellow, magenta, cyan and black image forming units.

3. The image forming apparatus according to claim 1, wherein said one image forming unit which is brought into contact with the conveyor belt by said first changing means is a black image forming unit.

4. An image forming apparatus comprising:

a feeding section for feeding a recording medium by use of a conveyor belt;

a plurality of image forming units placed side by side along said feeding section and having rotatable photosensitive drums, for transferring images of different colors onto a recording medium fed by said feeding section;

specifying means for selectively specifying a monochrome mode in which only one of said plurality of image forming units is used to transfer an image formed thereon onto a recording medium fed by said feeding section and a color mode in which said plurality of image forming units are used to transfer images formed thereon onto a recording medium fed by said feeding section;

a document cover for covering a document on a document table;

detecting means for detecting an open/closed state of said document cover;

reading means for reading an image of a document fed onto the document table;

first changing means for changing a state of said plurality of image forming units and the conveyor belt to a state in which only one of said plurality of image forming units is set in contact with the conveyor belt by moving said image forming units or the conveyor belt when switching from the color mode to the monochrome mode is specified by said specifying means and the open state of said document cover is detected by said detecting means;

second changing means for changing the state of said plurality of image forming units and the conveyor belt to a state in which all of said plurality of image forming units are set in contact with the conveyor belt by moving said image forming units or the conveyor belt when switching from the monochrome mode to the color mode is specified by said specifying means and the open state of said document cover is detected by said detecting means;

instructing means for instructing start of an image forming process after a change is made by one of said first and second changing means; and image forming means for forming an image read by said reading means on a recording medium by use of said one image forming unit which is set in contact with the conveyor belt by said first changing means or forming an image read by said reading means on a recording medium by use of all of said image forming units which are set in contact with the conveyor belt by said second changing means according to an instruction from said instructing means.

5. The image forming apparatus according to claim 4, wherein said image forming units are yellow, magenta, cyan and black image forming units.

6. The image forming apparatus according to claim 4, wherein said one image forming unit which is brought into contact with the conveyor belt by said first changing means is a black image forming unit.

7. An image forming apparatus comprising:

a feeding section for feeding a recording medium by use of a conveyor belt;

a plurality of image forming units placed side by side along said feeding section and having rotatable photosensitive drums, for transferring images of different colors onto a recording medium fed by said feeding section;

specifying means for selectively specifying a monochrome mode in which only one of said plurality of image forming units is used to transfer an image formed thereon onto a recording medium fed by said feeding section and a color mode in which said plurality of image forming units are used to transfer images formed thereon onto a recording medium fed by said feeding section;

an automatic document feeder having a detector for detecting documents on a document tray, for sequentially feeding the documents on the document tray onto a document table;

reading means for reading an image of a document fed onto the document table by said automatic document feeder;

a moving mechanism for vertically moving the conveyor belt;

first changing means for determining that a document is placed on the document tray of said automatic document feeder based on a detection signal from the detector and changing a state of said plurality of image forming units and the conveyor belt to a state in which only one of said plurality of image forming units is set in contact with the conveyor belt by downwardly moving the conveyor belt by use of said moving mechanism when switching from the color mode to the monochrome mode is specified by said specifying means;

second changing means for determining that a document is placed on the document tray of said automatic document feeder based on a detection signal from the detector and changing the state of said plurality of image forming units and the conveyor belt to a state in which all of said plurality of image forming units are set in contact with the conveyor belt by upwardly moving the conveyor belt by use of said moving mechanism when switching from the monochrome mode to the color mode is specified by said specifying means;

instructing means for instructing start of an image forming process after a change is made by one of said first and second changing means; and image forming means for forming an image read by said reading means on a recording medium by use of said one image forming unit which is set in contact with the conveyor belt by said first changing means or forming an image read by said reading means on a recording medium by use of all of said image forming units which are set in contact with the conveyor belt by said second changing means according to an instruction from said instructing means.

8. The image forming apparatus according to claim 7, wherein said image forming units are yellow, magenta, cyan and black image forming units.

9. The image forming apparatus according to claim 7, wherein said one image forming unit which is brought into contact with the conveyor belt by said first changing means is a black image forming unit.

* * * * *